W. LYON.
Mechanisms for Actuating Punches.
No. 148,724.                    Patented March 17, 1874.
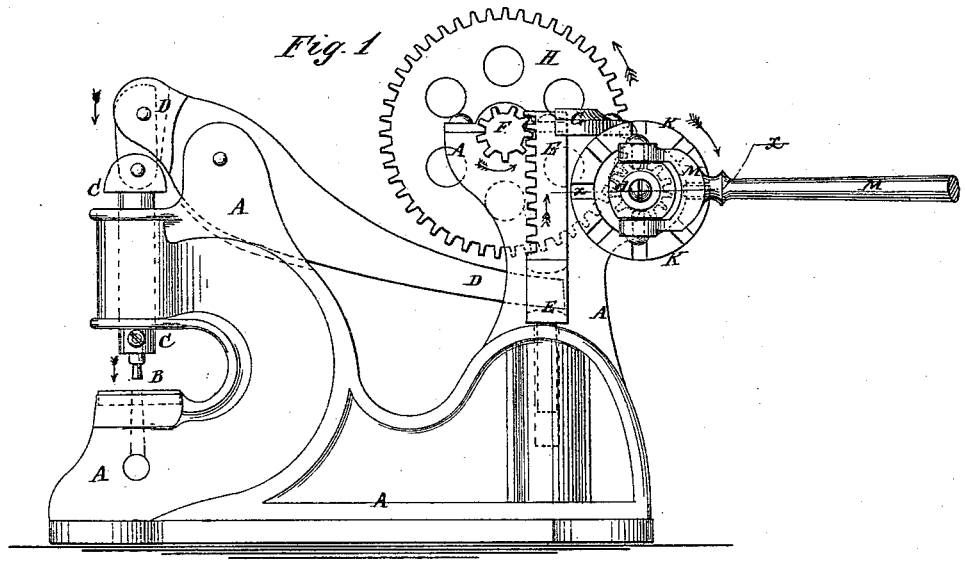
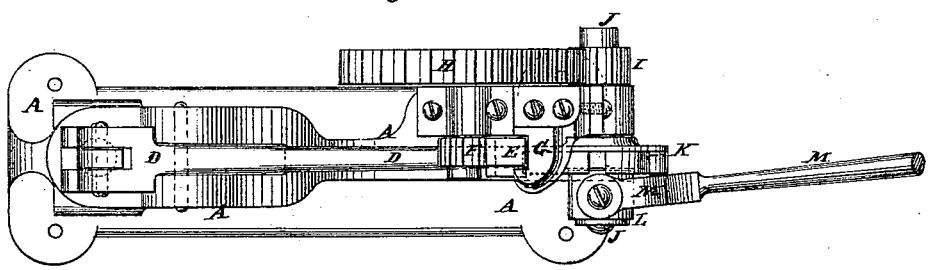
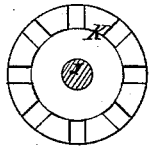
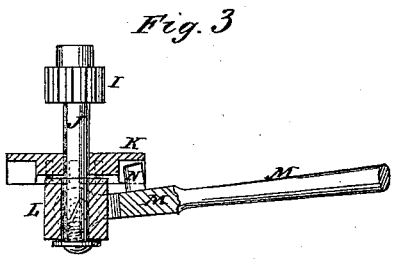
WITNESSES:
INVENTOR:
BY
ATTORNEYS.

UNITED STATES PATENT OFFICE.

WARREN LYON, OF MAMARONECK, NEW YORK.

IMPROVEMENT IN MECHANISMS FOR ACTUATING PUNCHES.

Specification forming part of Letters Patent No. 148,724, dated March 17, 1874; application filed February 14, 1874.

*To all whom it may concern:*

Be it known that I, WARREN LYON, of Mamaroneck, in the county of Westchester and State of New York, have invented a new and useful Improvement in Power for Punching-Presses, &c., of which the following is a specification:

Figure 1 is a side view of my improved power, shown as applied to a punching-press. Fig. 2 is a top view of the same. Fig. 3 is a detail section taken through the line $x\,x$, Fig. 1. Fig. 4 is a detail side view of the lever-wheel.

Similar letters of reference indicate corresponding parts.

My invention has for its object to furnish an improved power for operating a punching-press and other machines where great power is required to be exerted through considerable space.

The invention consists in the wheel provided with radial notches in the side of its rim, the lever provided with a projection upon its side, fitting into said notches, and the loose collar, in combination with the gearing by which the machine is operated, as hereinafter fully described.

I will describe my improved power as applied to a punching-press.

A represents the frame of the press; B, the punch, which is secured to the holder C in the ordinary way. The holder C works up and down in a guide-socket in the forward part of frame A, and to its upper end is pivoted the forward end of the lever D. The lever D is pivoted, near its forward end, to the frame A. The rear end of the lever D passes through a slot in the rack-bar E, the lower end of which works in a vertical socket in the frame A. The teeth of the rack-bar E mesh into the teeth of the small gear-wheel F, against which the said rack-bar is held by the arm or projection G, which is attached to or formed upon the frame A, and which bears against the rear side of the said rack-bar. The small gear-wheel F is attached to the end of a short shaft, which works in bearings attached to the frame A, and to its other end is attached a large gear-wheel, H, the teeth of which mesh into the teeth of a small gear-wheel, I, attached to the end of the short shaft J, which works in bearings attached to the frame A, and to which, near its other end, is rigidly attached a wheel, K, in the outer side of the rim of which are formed a series of radial notches, as shown in Figs. 1, 2, 3, and 4. Upon the end of the shaft J, at the notched side of the wheel K, is secured a loose collar, L, to which is pivoted the forked end of the lever M, upon the side of which is formed, or to it is attached, a projection, N, in such a position as to enter the notches of the wheel K.

By this construction, by operating the lever M, the wheel K is turned in either direction, which gives motion to the gearing I H F E, by which the machine is operated.

The peculiar construction of the lever M N and notched wheel K enables the said lever to be readily shifted at the end of a stroke to obtain a new purchase, so that immense power may be applied by a series of successive efforts until the desired effect has been accomplished. This power, when applied to a punching-press, enables the punch to be readily forced through a bar five-eighths inch thick, or even thicker. This power may be applied with equal facility to a shear or other machine.

Having thus described my invention, I claim as new and desire to secure by Letters Patent—

The wheel K, provided with radial notches in the side of its rim, the lever M, provided with a projection, N, fitting into said notches, and the loose collar L, in combination with the gearing I H F E, by which the machine is operated, substantially as herein shown and described.

WARREN LYON.

Witnesses:
    JAMES T. GRAHAM,
    T. B. MOSHER.